S. O. ROGERS, Jr.

Car Coupling.

No. 75,055.

Patented March 3, 1868.

United States Patent Office.

SILAS O. ROGERS, JR., OF STANFORDVILLE, NEW YORK.

Letters Patent No. 75,055, dated March 3, 1868.

IMPROVED CAR-COUPLING.

The Schedule referred to in these Letters Patent and making part of the same.

TO ALL WHOM IT MAY CONCERN:

Be it known that I, SILAS O. ROGERS, Jr., of Stanfordville, in the county of Dutchess, and State of New York, have invented a new and useful Improvement in Car-Coupling; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish a safe, convenient, and reliable car-coupling, which shall be self-coupling, and at the same time simple in construction, and not liable to get out of order; and it consists in the construction and combination of the tumbler, spring, slide bar, and lever with each other and with the bumper-head, substantially as herein shown and described, and for the purpose set forth.

Figure 1:
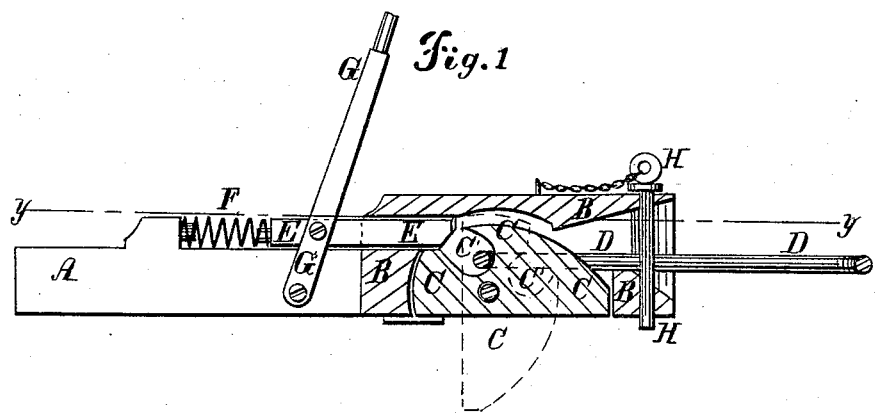
Figure 1 is a side view of my improved coupling partly in section.
Figure 2:
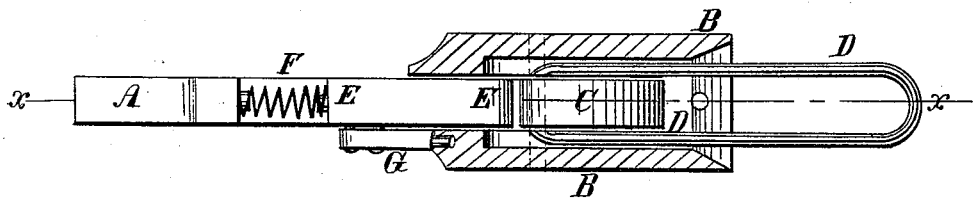
Figure 2 is a top view of the same, partly in section, through the line $y\ y$, fig. 1.

A, the draught-bar, and B is the bumper-head of my improved coupling. C is the tumbler, which is made in substantially the form shown in fig. 1, having a hook or recess, $c'$, formed in the rear part of its upper side to receive and hold the link D. The tumbler C is placed in a recess formed in the under part of the bumper-head B, where it is pivoted in place by a pin, as shown in fig. 1. The tumbler C is held in place, when coupling the cars, by the sliding bar E, the forward end of which rests upon a flat part of the rear part of the upper edge of the said tumbler, which locks it securely. The bar E slides back and forth in a cavity formed in the upper part of the bumper-head B for its reception, and it is held forward to its place by a coiled or other spring, F, which presses against the rear end of said bar, as shown in figs. 1 and 2. G is a lever, which is pivoted to the bar E, and the lower end of which is pivoted to the draught-bar A, or bumper-head B. The upper end of the lever G extends up into such a position that it may be conveniently reached and operated. The link D is made in the ordinary form, except that it is required to be made longer. The bumper B is provided with an ordinary coupling-pin, H, for convenience in coupling cars provided with an ordinary coupling. When uncoupled, the tumbler C stands in the position shown in red in fig. 1.

As the cars are run together the link D enters the recess $c'$ of the tumbler C, and pushes it back, the tumbler C pushing the sliding bar E back until the said tumbler takes the position shown in black in fig. 1, the spring F immediately forcing the bar E forward, securely locking the said tumbler. To uncouple the cars, the sliding bar E is drawn back by means of the lever G, unlocking the tumbler C, and allowing the link D to be drawn out, leaving the tumbler in the position shown in red in fig. 1, where it is held by the bar E, until said bar and tumbler are again pushed back by the link D.

Having described my invention, I claim as new, and desire to secure by Letters Patent—

The tumbler C, constructed substantially in the form and manner herein shown and described, the slide-bar E, coiled spring F or equivalent, and lever G, in combination with each other and with the bumper-head B, substantially as and for the purpose herein set forth and described.

The above specification of my invention signed by me, this 20th day of August, 1867.

S. O. ROGERS, Jr.

Witnesses:
WM. E. GURNEY,
HENRY R. COX.